United States Patent
Ge et al.

(10) Patent No.: US 11,109,437 B2
(45) Date of Patent: Aug. 31, 2021

(54) METHOD AND MIGRATION MANAGER COMPONENT FOR TRANSFERRING AN APPLICATION AND SYSTEM FOR MANAGING TERMINAL DEVICE COMMUNICATION CONNECTIONS

(71) Applicant: Apple Inc, Cupertino, CA (US)

(72) Inventors: Qihong Ge, Beijing (CN); Chunming Ren, Beijing (CN)

(73) Assignee: Apple Inc., Cupertino, CA (US)

( * ) Notice: Subject to any disclaimer, the term of this patent is extended or adjusted under 35 U.S.C. 154(b) by 47 days.

(21) Appl. No.: 15/777,246

(22) PCT Filed: Dec. 22, 2015

(86) PCT No.: PCT/CN2015/098211
§ 371 (c)(1),
(2) Date: May 18, 2018

(87) PCT Pub. No.: WO2017/107044
PCT Pub. Date: Jun. 29, 2017

(65) Prior Publication Data
US 2018/0332654 A1 Nov. 15, 2018

(51) Int. Cl.
*H04W 76/25* (2018.01)
*H04W 8/00* (2009.01)
(Continued)

(52) U.S. Cl.
CPC ............ *H04W 76/25* (2018.02); *G06F 9/547* (2013.01); *H04L 67/10* (2013.01); *H04W 8/00* (2013.01); *H04W 88/085* (2013.01)

(58) Field of Classification Search
CPC ....... H04W 76/25; H04W 8/00; H04W 88/08; H04W 88/12; H04W 88/085; G06F 9/547; H04L 67/10; H04L 67/145
See application file for complete search history.

(56) References Cited

U.S. PATENT DOCUMENTS

2009/0157882 A1* 6/2009 Kashyap ................. H04L 69/16
709/227
2009/0247141 A1* 10/2009 Vale ...................... H04W 24/02
455/418

(Continued)

FOREIGN PATENT DOCUMENTS

CN 101616454 A 12/2009
CN 104080136 A 10/2014
(Continued)

OTHER PUBLICATIONS

International Search Report based on application No. PCT/CN2015/098211 dated Sep. 26, 2016 (11 pages).

*Primary Examiner* — Nam T Tran
*Assistant Examiner* — Lam H Duong
(74) *Attorney, Agent, or Firm* — Kowert, Hood, Munyon, Rankin & Goetzel, P.C.

(57) ABSTRACT

A method and migration manager component for transferring a first application running on a first computing device from the first computing device to a second computing device, the first application being configured to manage at least one communication connection to at least one terminal device via a base station antenna structure, the method comprising: initializing a second application configured to manage the at least one communication connection to the at least one terminal device via the base station antenna structure; transferring management of the at least one communication connection from the first application to the second application; stopping the execution of the first application at the first computing device; initializing the first application at the second computing device; transferring management of the at least one communication connection from the second application to the first application.

25 Claims, 10 Drawing Sheets

(51) Int. Cl.
*G06F 9/54* (2006.01)
*H04L 29/08* (2006.01)
*H04W 88/08* (2009.01)

(56) References Cited

U.S. PATENT DOCUMENTS

| | | | |
|---|---|---|---|
| 2011/0138060 A1* | 6/2011 | Purkayastha | H04L 65/605 |
| | | | 709/227 |
| 2013/0100813 A1* | 4/2013 | Velamati | H04W 8/12 |
| | | | 370/236 |
| 2015/0032846 A1* | 1/2015 | Doken | H04L 67/141 |
| | | | 709/217 |
| 2017/0353903 A1* | 12/2017 | Rost | H04W 36/10 |

FOREIGN PATENT DOCUMENTS

| | | |
|---|---|---|
| CN | 104244427 A | 12/2014 |
| EP | 2619961 A1 | 7/2013 |
| WO | 2012038845 A1 | 3/2012 |
| WO | 2013123670 A1 | 8/2013 |

\* cited by examiner

METHOD AND MIGRATION MANAGER COMPONENT FOR TRANSFERRING AN APPLICATION AND SYSTEM FOR MANAGING TERMINAL DEVICE COMMUNICATION CONNECTIONS

CROSS-REFERENCE TO RELATED APPLICATION

The present application is a national stage entry according to 35 U.S.C. § 371 of PCT application No. PCT/CN2015/098211 filed on Dec. 22, 2015, and is incorporated herein by reference in its entirety and for all purposes.

TECHNICAL FIELD

Various aspects of this description generally relate to methods and migration manager components for transferring a first application running on a first computing device from the first computing device to a second computing device and systems for controlling at least one telecommunication base station.

BACKGROUND

Telecommunication base stations, such as eNodeBs (E UTRAN Node B/Evolved NodeB) or other mobile radio base stations for Long Term Evolution (LTE), Universal Mobile Telecommunications System (UMTS); Global System for Mobile Communications (GSM) and the like, are usually controlled by one or more so-called Radio Network Controllers (RNC) or similar facilities in a distributed manner. Usually, multiple eNodeBs are realized by (a multitude of) servers (which are also referred to as computing devices in the following), which are running applications for managing and controlling base station antennas. Since the number of mobile radio communication terminal devices (e.g. user equipments (UE)) managed by these applications may vary over time, the workload caused by these applications varies. This may result in inefficient use of the hardware. Furthermore, maintenance of the hardware may lead to disruption of reception and service of the terminal devices.

BRIEF DESCRIPTION OF THE DRAWINGS

In the drawings, like reference characters generally refer to the same parts throughout the different views. The drawings are not necessarily to scale, emphasis is instead generally being placed upon illustrating the principles of the invention. In the following description, various embodiments of the invention are described with reference to the following drawings, in which.

DETAILED DESCRIPTION

Figure 1:
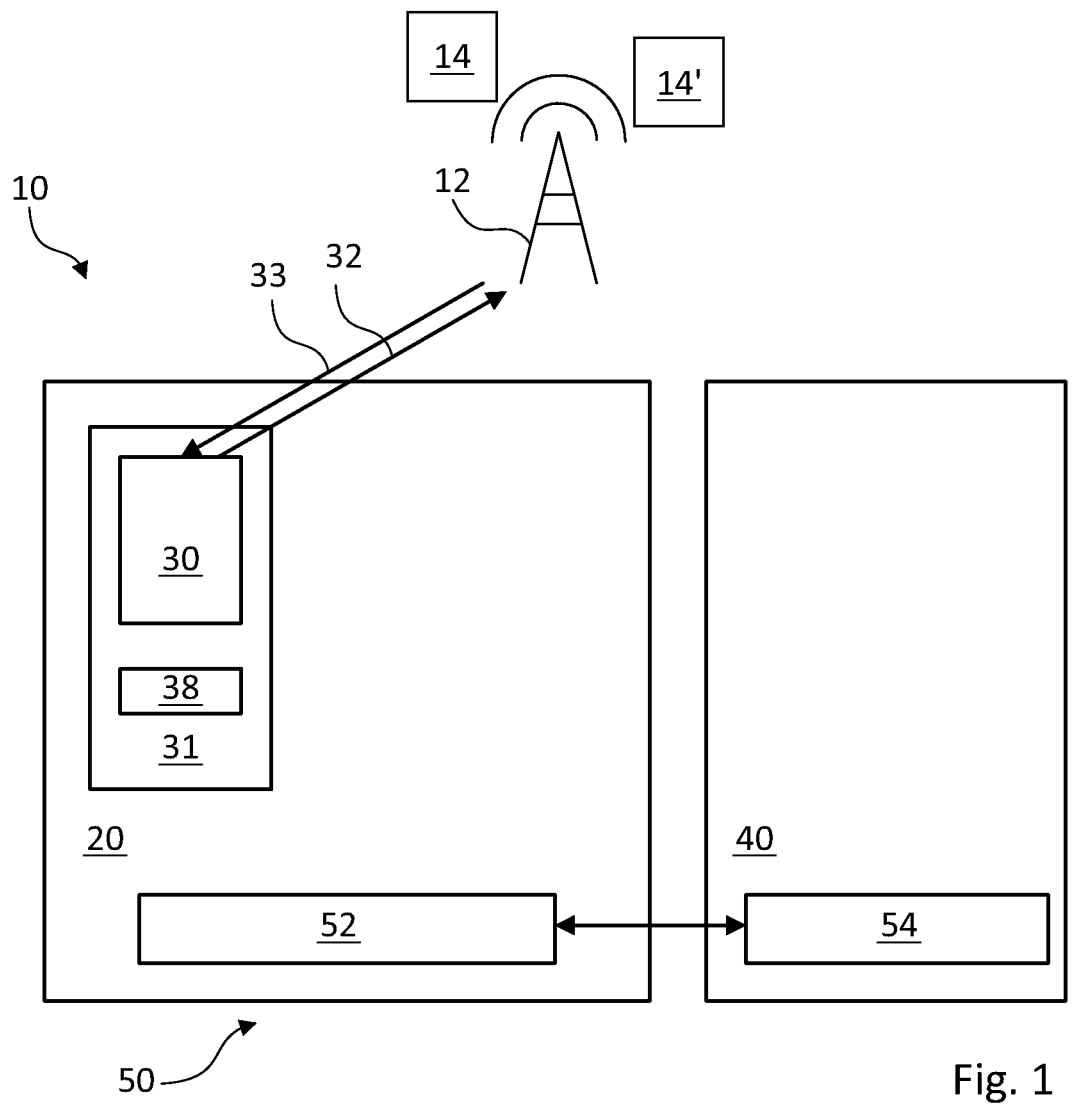
FIG. 1 shows a system for controlling at least one telecommunication base station, running a first application on a first computing device.

FIG. 1 shows a system 10 for controlling managing terminal device communication connections. The System 10 may include a base station antenna structure 12. The base station antenna structure 12 may include a single antenna, a group of antennas or an antenna array, e.g. to serve one (sole/single) cell. The system 10 may further include a first computing device 20 (Source platform/Source AI platform). The first computing device 20 is configured to run (execute) a first application 30, 30' (eNodeB application). An application may be a program, e.g. a series of instructions executable by a processor (CPU). The first application 30, 30' may be part of the system 10. The first application 30, 30' is configured to manage (is managing) at least one communication connection to at least one terminal device 14 (user equipment, handheld device, smartphone, mobile device . . . ) via the base station antenna structure 12. The first application 30, 30' may be configured to manage at least the communication connection of the at least one terminal device 14 to a telecommunication network (e.g. GSM, UMTS, LTE, CDMA2000, LTE-A, . . . ) via the base station antenna structure 12 by sending first signals 32 including communication connection control signals 34 and service data signals 36 to the at least one terminal device 14. The first application 30, 30' may be configured to control at least the base station antenna structure 12. The first application 30, 30' may be configured to send signals 32, 32' including communication connection control signals 34 and service data signals 36 via the base station antenna structure 12 to at least one terminal device 14. The first application 30, 30' may further be configured to receive signals 33, e.g. service data signals, from the at least one terminal device 14 via the base station antenna structure 12. The connection control signals 34 may include one, some or all of the following:

synchronization signals (e.g. Primary Synchronization Signal/PSS, Secondary Synchronization Signal/SSS), reference signals (e.g. Cell-Specific reference signal/CRS), Channel information (e.g. Physical Broadcast Channel/PBCH) and formatting information (e.g. Physical Control Format Indicator Channel/PCFICH). The communication connection control signals 34 may include or may essentially consist of the information needed by the terminal device 14 to upkeep (and establish) a communication connection between the terminal device 14 and the system 10. The service data signals 36 may include information, data and/or signals that are sent to or received from a different communication partner (another server, a different terminal device, a different participant of the communication network) via the established connection between the system 10 and the terminal device 14, e.g. via Physical Downlink Shared Channel (PDSCH) or Physical Uplink Shared Channel (PUSCH) or similar.

A separate application may be provided to receive signals from the terminal device 14.

System 10 may further include a second computing device 40 configured to run the first application 30, 30'. The computing devices 20, 40, e.g. servers, may include a processor, configured to execute at least the first application, and memory, configured to save process data of at least the first application while it is running. The computing devices 20, 40 may be configured to run (execute) an operating system under which the first application is executed. The computing devises 20, 40 may include main storage. The computing devices 20, 40 may include communication interfaces (e.g. Network interfaces), provided to connect the computing device with the base station antenna structure 12. The computing devices 20, 40 may have similar or same architectures. The computing devices 20, 40 may have different architectures, e.g. may be implemented with different kind of hardware (processor, memory, network controller), protocols etc. The first and second computing devices 20, 40 may be part of a group of servers located in a same location. The base station antenna structure 12 together with the first application 30, 30' may form a base station, e.g. a (wireless) telecommunication base station, e.g. an evolved Node B (according to third generation partnership program/3GPP, long term evolution/LTE or similar or future telecommunication definitions/protocols). Further applications, e.g. applications provided to manage communication connections to terminal devices via further/different antenna structures (control different base stations), may run on the first computing device 20. The first computing device 20 may be configured to run additional applications, e.g. applications provided to manage communication connections to terminal devices via further antenna structures (control different base stations). Further applications, e.g. applications provided to manage communication connections to terminal devices via further/different antenna structures (control different base stations), may run on the second computing device 40. The second computing device 40 may be configured to run additional applications, e.g. applications provided to manage communication connections to terminal devices via further antenna structures (control different base stations).

The first and second computing devices 20, 40 may be configured to run the first application 30, 30' in a virtual environment 31, 31' (eNodeB Virtual Machine). The virtual environment 31, 31' may be an application providing a specific working environment for the first application 30, 30', e.g. providing an emulation of a specific type of hardware (e.g. processor, memory, network adapter etc.). This may allow the first application 30 to run independently of the actual hardware installed on the first and second computing devices 20, 40. This may allow a quick and efficient transfer of the first application 30 between the computing devices 20, 40. Further this may allow for an easy resource management, e.g. if more than one application is run on the first (or second) computing device 20, 40.

The first computing device 20 may be configured to run the first application directly, e.g. directly on the operating system level, while the second computing device 40 may be configured to run the first application in a virtual environment, e.g. emulating the first computing device, or vice versa.

System 10 further includes a migration manager component 50 (e.g. a migration manager component circuit), configured to control a transfer of the first application 30, 30' from the first computing device 20 to the second computing device 40. The migration manager component 50 may be configured to estimate (or measure) a workload at least of the first computing device 20 and decide upon that estimation (or measurement) that the first application 30, 30' should be moved away from the first computing device and trigger a migration process (e.g. in case a value indicative of the workload exceeds a predefined workload threshold). The migration manager component 50 may be configured to receive external signals, e.g. from a workload estimation (by circuit, application/software program or similar) and or from a maintenance planning (by circuit, application/software program or similar) and trigger the migration process on receipt of such signal. This may allow for a better workload distribution, e.g. if the first computing device 20 is on a high workload. This also may allow to reduce power consumption, e.g. if the first computing device 20 is mostly idle and moving the first application 20 away would allow for shutdown/standby of the first computing device 20. This may further allow maintenance of the hardware of the first computing device 20 without a loss of connection for terminal devices 14 connected via the first application 30, 30'.

The migration manager component 50 is configured to initialize a second application 60 (keep alive application). The second application 60 is configured to control the at least one base station antenna structure 12. The second application 60 is configured to manage the at least one communication connection to the at least one terminal device 14 via the base station antenna structure 12. The second application 60 may be configured to manage the at least one communication connection of the at least one terminal device 14 to the telecommunication network via the base station antenna structure 12 by sending second signals 62 including connection control signals 64 to the at least one terminal device 14. The second application 60 may be configured to at least send signals 62 including connection control signals 64 to the at least one terminal device 14. The second application 60 may be configured to (e.g. only) send signals 62 essentially consisting of only connection control signals 64 to the at least one terminal device 14. The second application 60 may be part of the system 10. Initializing an application may include loading the application from a main storage. Initializing an application may include setting parameters of the application.

The migration manager component 50 is implemented as one or more applications running on the first and second computing devices 20, 40. The migration manager component 50 includes a first component 52 (Live Migration manager component) running as an application on the first computing device 20 and includes second component 54 (Live Migration manager component) running as an application on the second computing device 40. The first and second component 52, 54 are configured to communicate with each other, e.g. via at least one network protocol, e.g. via at least one Radio Resource Control (RRC) network protocol.

The migration manager component 50 may be implemented as hardware and/or software separately from the first and/or second computing device 20, 40. The migration manager component 50 may be an application running on a third computing device that is connected to the first and second computing device. The migration manager component 50 may be implemented as hardware, e.g. including a first hardware component (e.g. an application specific integrated circuit/ASIC) in the first computing device and including a second hardware component in the second computing device. The migration manager component may include at least one communication means for communicating with the first and second computing devices. The first and/or second computing device 20, 40 may be configured to run the first or second component in a virtual environment.

Figure 2:
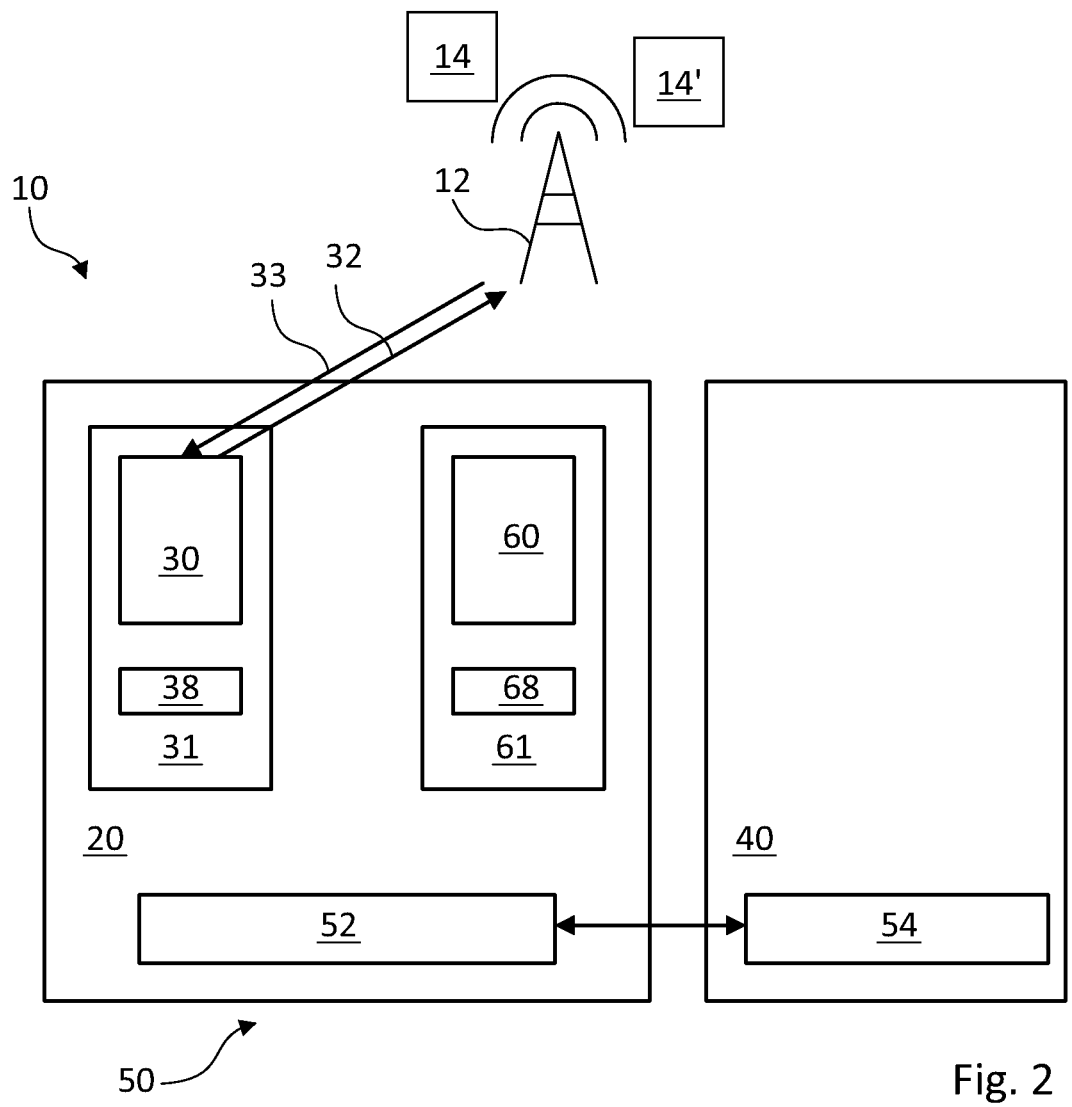
FIG. 2 shows the system of FIG. 1, after a second application was initialized.

The migration manager component 50 may be configured to initialize the second application 60 on the first computing device 20 (see FIG. 2). The migration manager component 50 may be configured to initialize the second application 60 in a virtual environment 61 (of the first computing device 20) (Keep alive Virtual Machine). The migration manager component 50 may be configured to initialize the second application 60 with the same telecommunication base station parameters (base station antenna structure parameters) as are used by the first application 30. The migration manager component 50 may be configured to initialize the second application 60 on demand only, e.g. after a transfer of an Application is triggered. This may save resources. The migration manager component may be configured to initialize the second application 60 on startup of the first computing device 20 and keep the second application 60 running in case it is needed. When a transfer of an application is triggered, the migration manager component 50 may be configured to set telecommunication base station parameters (base station antenna structure parameters) in the second application 60 to be the same as of the first application 30. This may reduce the time needed for transferring the first application.

The migration manager component may be configured to run/initialize the second application on a same computing device that is running the migration manager component 50. The migration manager component 50 may be configured to run/initialize the second application directly on the first or second computing device (without usage of a virtual environment). The migration manager component 50 may be configured to run/initialize the second application on the second computing device (in a virtual environment). The migration manager component 50 may be configured to run/initialize the second application on a further computing device and/or ASIC.

Figure 3:
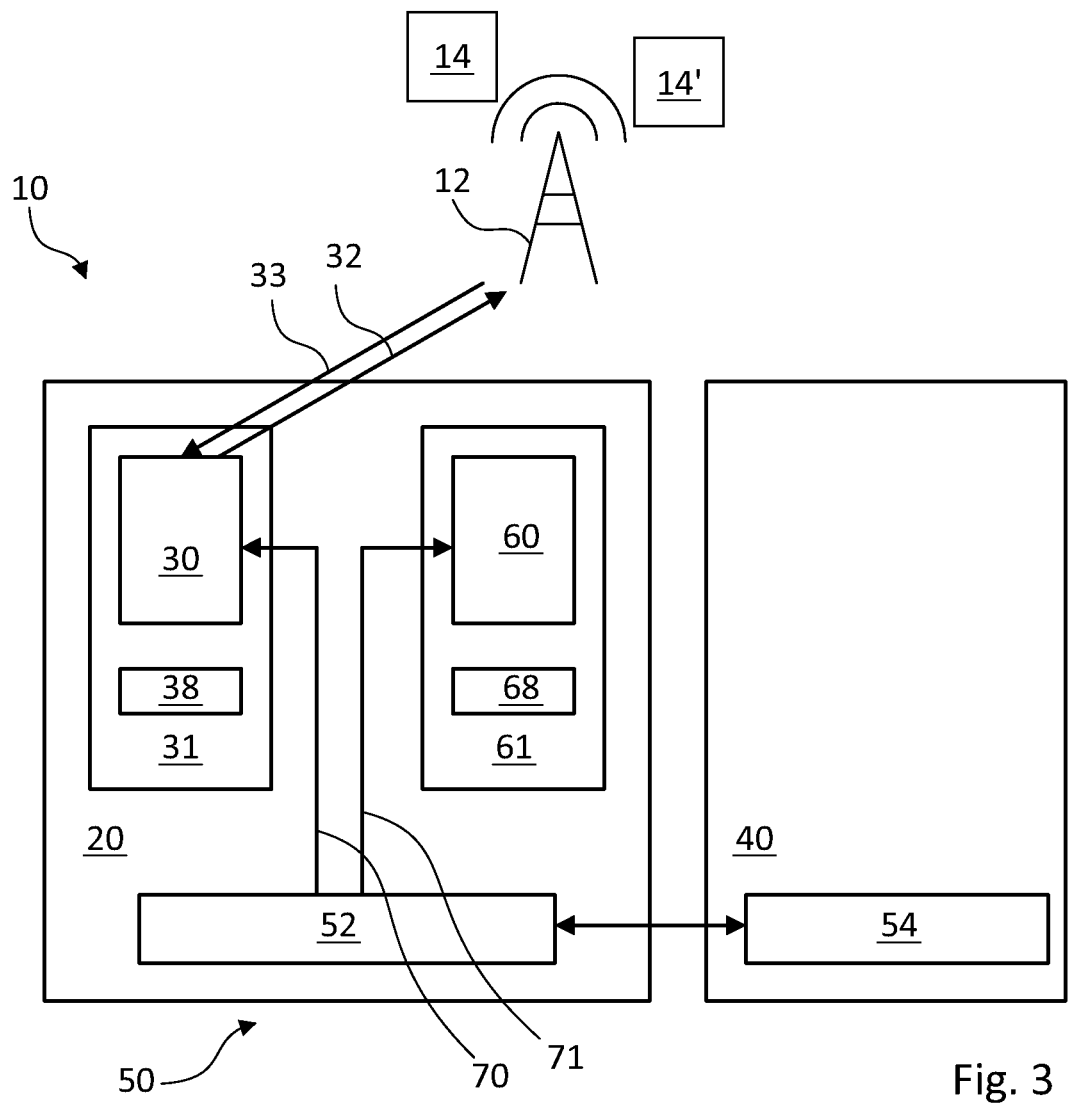
FIG. 3 shows the system of FIG. 2, a migration manager component sending a signal to the first and second application setting a first point in time.

The migration manager component 50 is configured to provide a command 70 to the first application 30 to stop sending signals 32 to the at least one terminal device 14 and to provide a command 71 to the second application 60 to start sending signals 62 to the at least one terminal device. The migration manager component may be configured to transfer management of the at least one communication connection of the at least one terminal device 14 to the telecommunication network via the base station antenna structure 12 from the first application 30 to the second application 60. The migration manager component 50 may be configured to provide commands 70, 71 to the first and second application 30, 60 (see FIG. 3). The commands may be indicating a first point in time (a first time) 80 at which the first application 20 is to stop sending signals 32 and the second application 60 is to start sending signals 62 via the base station antenna structure 12. The command 70 to the first application 30 may include a command to stop sending signals (down) at the first point in time 80. The command 71 to the second application 60 may include a command to start sending signals (up) at the first point in time 80. The migration manager component 50 may be configured to provide the first point in time 80 in form of an absolute time. The migration manager component 50 may be configured to provide the first point in time 80 in form of a relative time (e.g. "in 200 ms", "in 100 ms", "in 10 ms", a number of frames or subframes, or similar), e.g. a time interval after the commands 70, 71 where sent.

Figure 4:
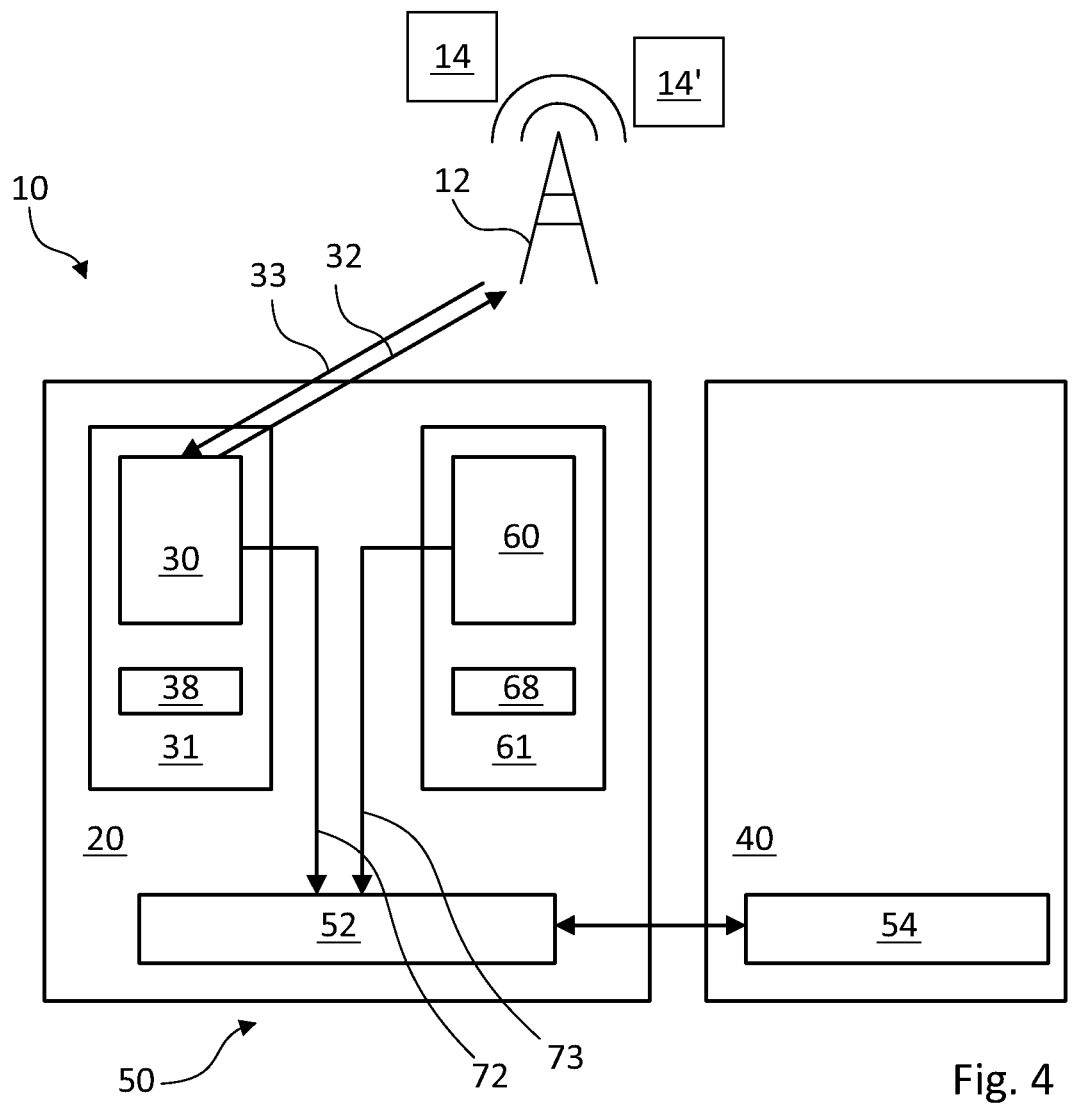
FIG. 4 shows the system of FIG. 3, the applications sending acknowledgement signals.

The first application 30 and the second application 60 may be configured to send an acknowledgement signal 72, 73 to the migration manager component 50 in response to the signal 70, 71 from the migration manager component 50 (see FIG. 4). The migration manager component 50 may be configured to send the commands 70, 71 to the first and second application 30, 60 again, if no acknowledgement signal 72, 73 is received. The migration manager component 50 may be configured to restart the second application 60, if (repeatedly) no acknowledgement signal is received.

Figure 5A:
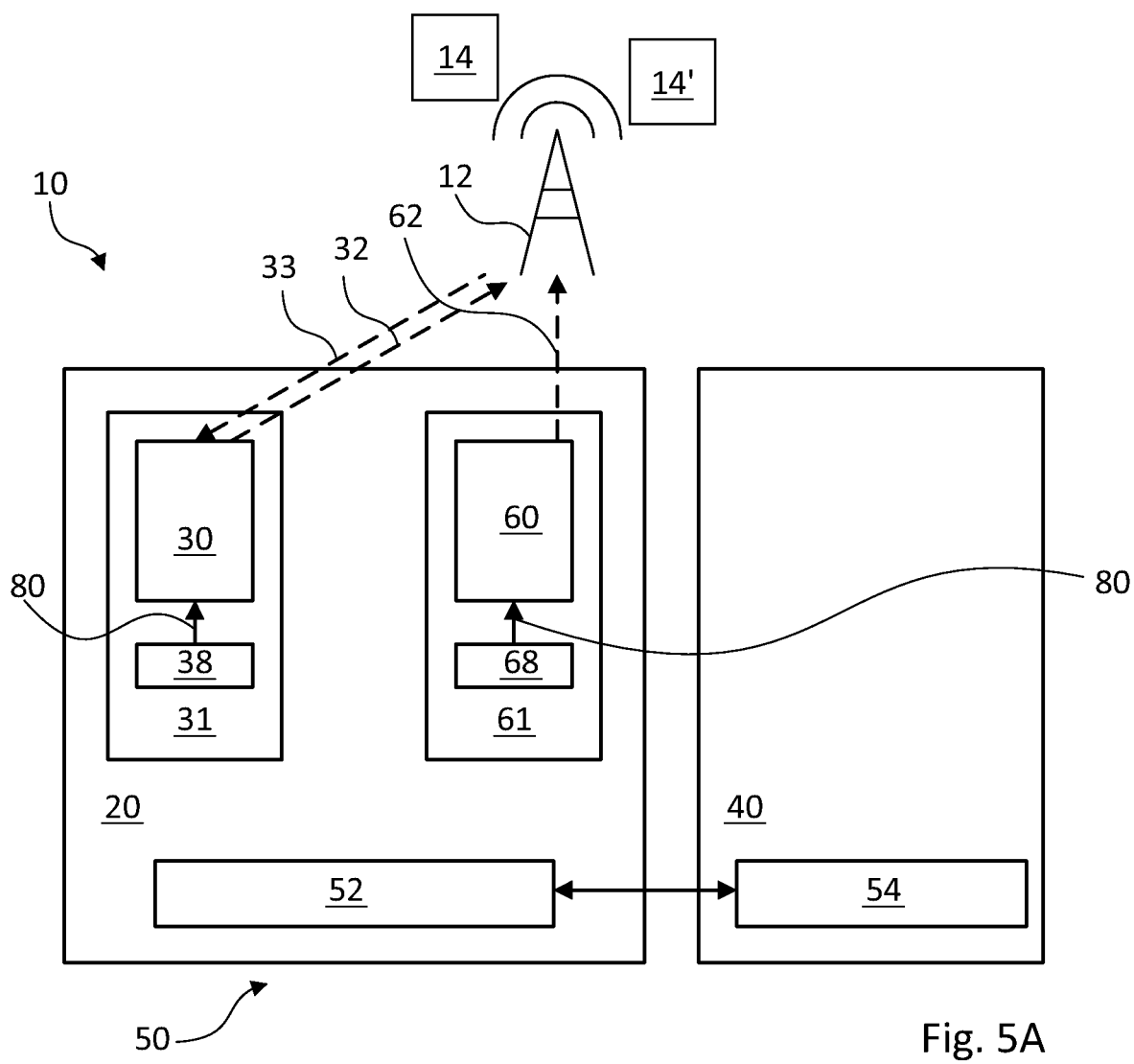
FIGS. 5A and 5B show the system of FIG. 4 at the first point in time and the stopping of the first application and the starting of the second application.
Figure 5B:
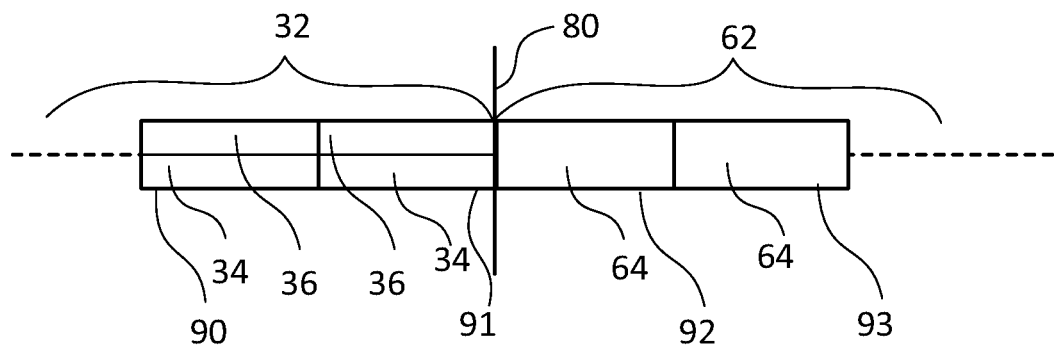

The first application 30 may be configured to receive time signals from a timer 38 (e.g. a real time clock, an internal timer). The timer 38 is a timer of the virtual environment 31 in which the first application 30 is running. The second application 60 may be configured to receive time signals from a timer 68. The timer 68 is a timer of the virtual environment 61 in which the second application 60 is running. The timers 38, 68 are synchronized, e.g. via a system timer of the first computing device 20. The first application 30 is configured to stop sending signals 32, when the timer 38 reaches the set first point in time 80 (see FIGS. 5A, 5B). The second application 60 is configured to start sending signals 62, when the timer 68 reaches the set first point in time 80. Management of the at least one communication connection to the at least one terminal device 14 via the base station antenna structure 12 is transferred from the first application 30 to the second application 60 at the first point in time 80, wherein the first application 30 stops sending signals 32 and the second application 60 starts sending signals 62 via the base station antenna structure 12. FIG. 5B exemplarily shows an excerpt of the communication from the system 10 via the base station antenna structure 12. Before the first point in time 80, e.g. during two subframes 90, 91 immediately before the first point in time, the signal of the base station antenna structure 12 consists of the signals 32 of the first application, which contain connection control signals 34 as well as service data signals 36. After the connection management has been taken over by the second application 60 at the first point in time 80, the signal sent via the base station antenna structure 12 contains the signals 62 of the second application 60, e.g. during the subframes 92, 93, which only include connection control signals 64. The first point in time 80 is set to be at the end of subframe 91, which is the beginning of subframe 92. This allows a continuous connected status of the terminal devices 14.

The timers may be system timers, e.g. when the first or second application 30, 60 is run directly on the first computing device 20. The timers may be directly or indirectly synchronized via a signal from the Global Position System (GPS). The timers 38, 68 may be synchronized with a timer of the migration manager component 50. The migration manager component 50 may be configured to set the first point in time 80 in dependence of a time schedule of the first application 30. The migration manager component 50 may be configured to set the first point in time 80 as the point at which a new subframe (or frame or time interval) of a communication protocol of the first application 30, 30' starts. The point in time 80 may be several subframes (or frames or time intervals) of the communication protocol in the future in regard to the moment of sending the signals 70, 71 to the first and second application 30, 60.

Figure 6:
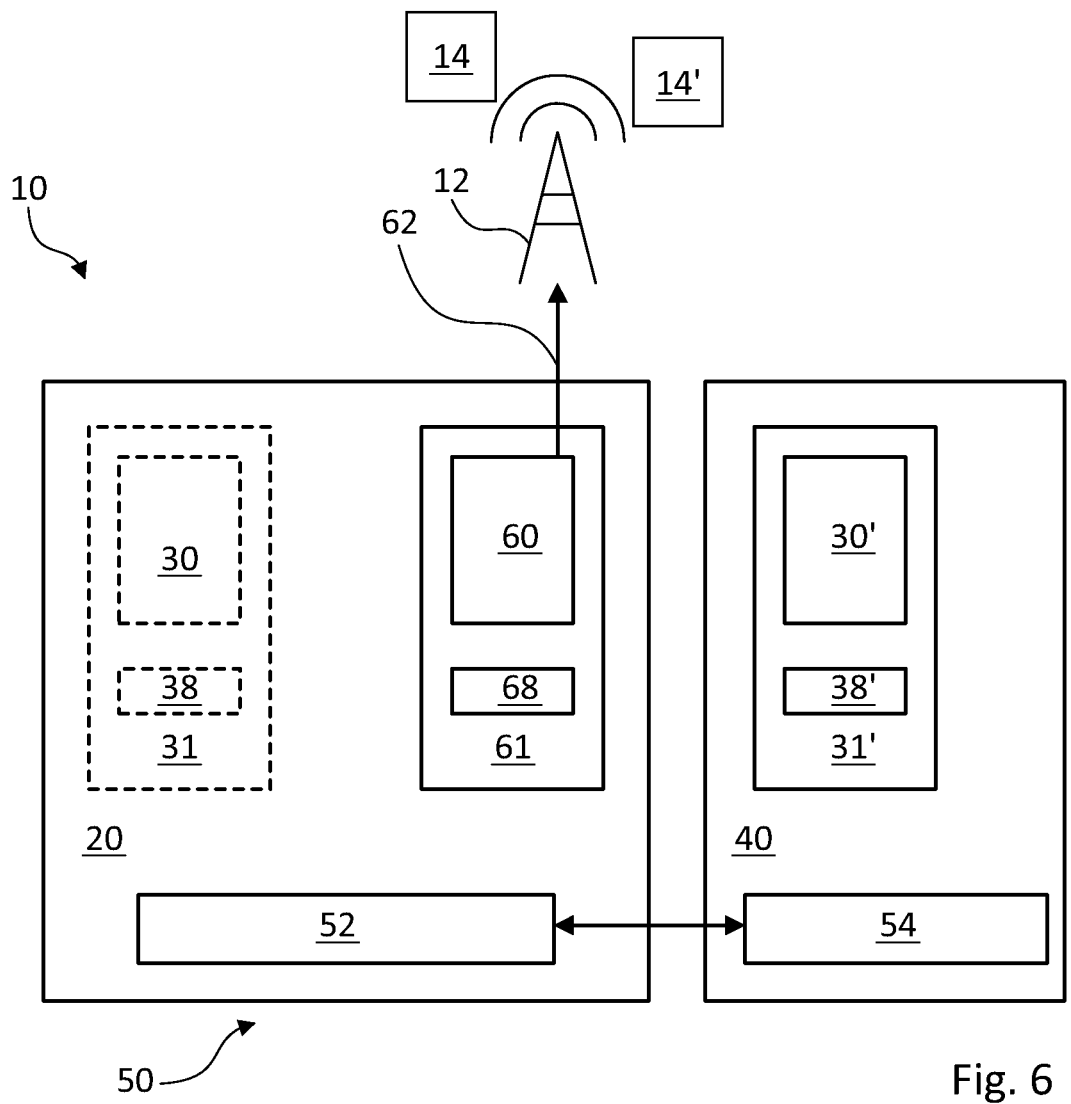
FIG. 6 shows the system of FIG. 5 after the first application was moved to a second computing device.

After the second application 60 has taken over connection management, the migration manager component 50 is configured to stop execution of the first application 30 on the first computing device 20 and initialize the first application 30' at the second computing device 40. The migration manager component 50 may be configured to initialize the first application 30' in the virtual environment 31' on the second computing device 40 (see FIG. 6). The migration manager component 50 is configured to duplicate the state of the memory of the first application 30 in the second computing device 40. The migration manager component 50 is configured to copy the state of the memory of the first application 30 from the first computing device 20 to the second computing device 40. The migration manager component 50 may be configured to duplicate an exact state of the first application 30 from the first computing device 20 to the second computing device 40. This may allow for a nearly continuous operation, as data that is supposed to be submitted to the terminal device 14 via service data signals 36 part of the signals 32 and is saved in the memory of the application may be transmitted after the first application 30 is transferred by the first application 30'.

The migration manager component may be configured to initialize the first application on the second computation device using standard parameters. This may allow for a quick transfer as barely any data has to be transmitted between the first and second computing devices 20, 40.

Figure 7:
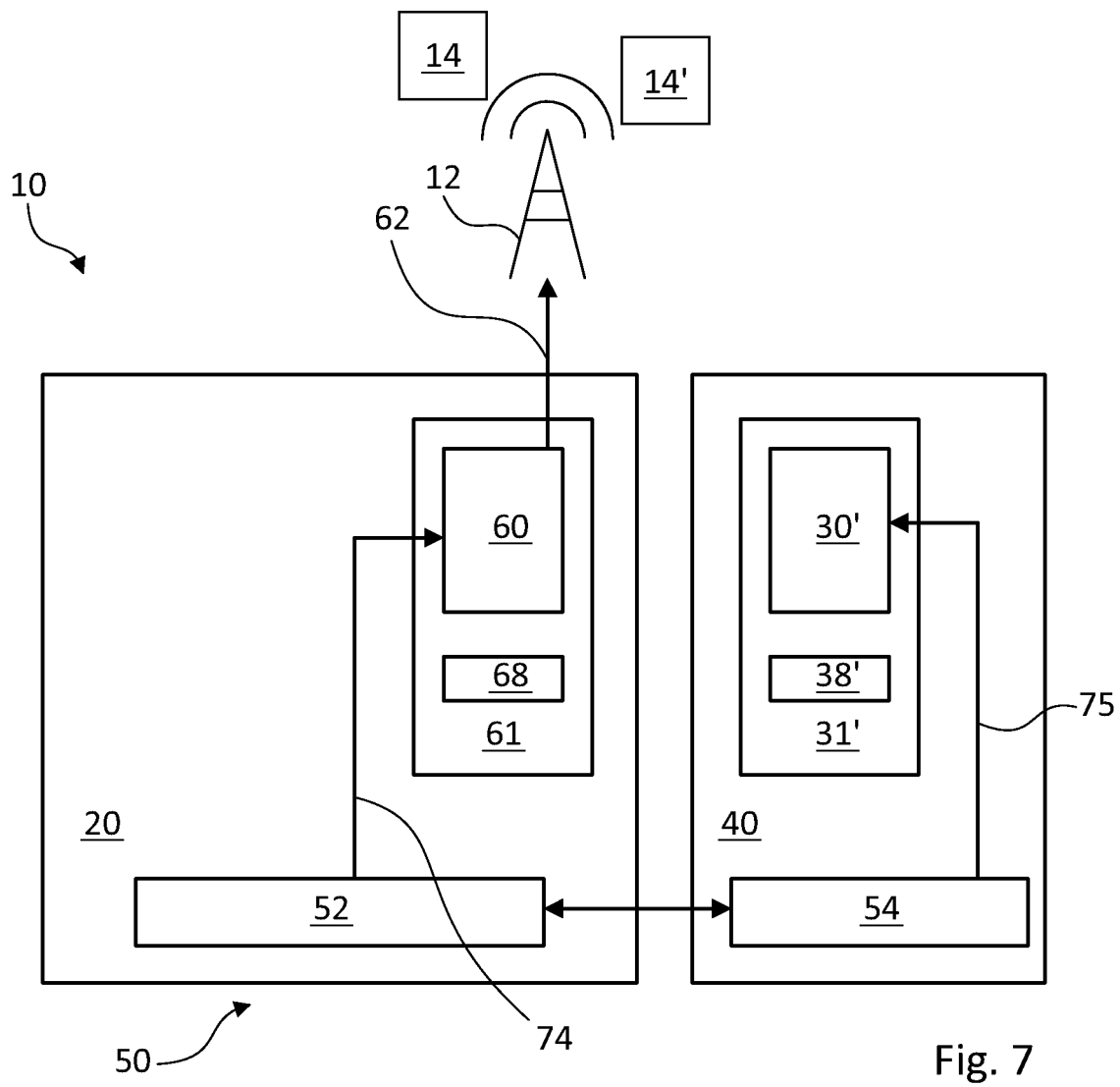
FIG. 7 shows the system of FIG. 6, the migration manager component sending a signal to the first and second application, setting a second point in time.
Figure 8:
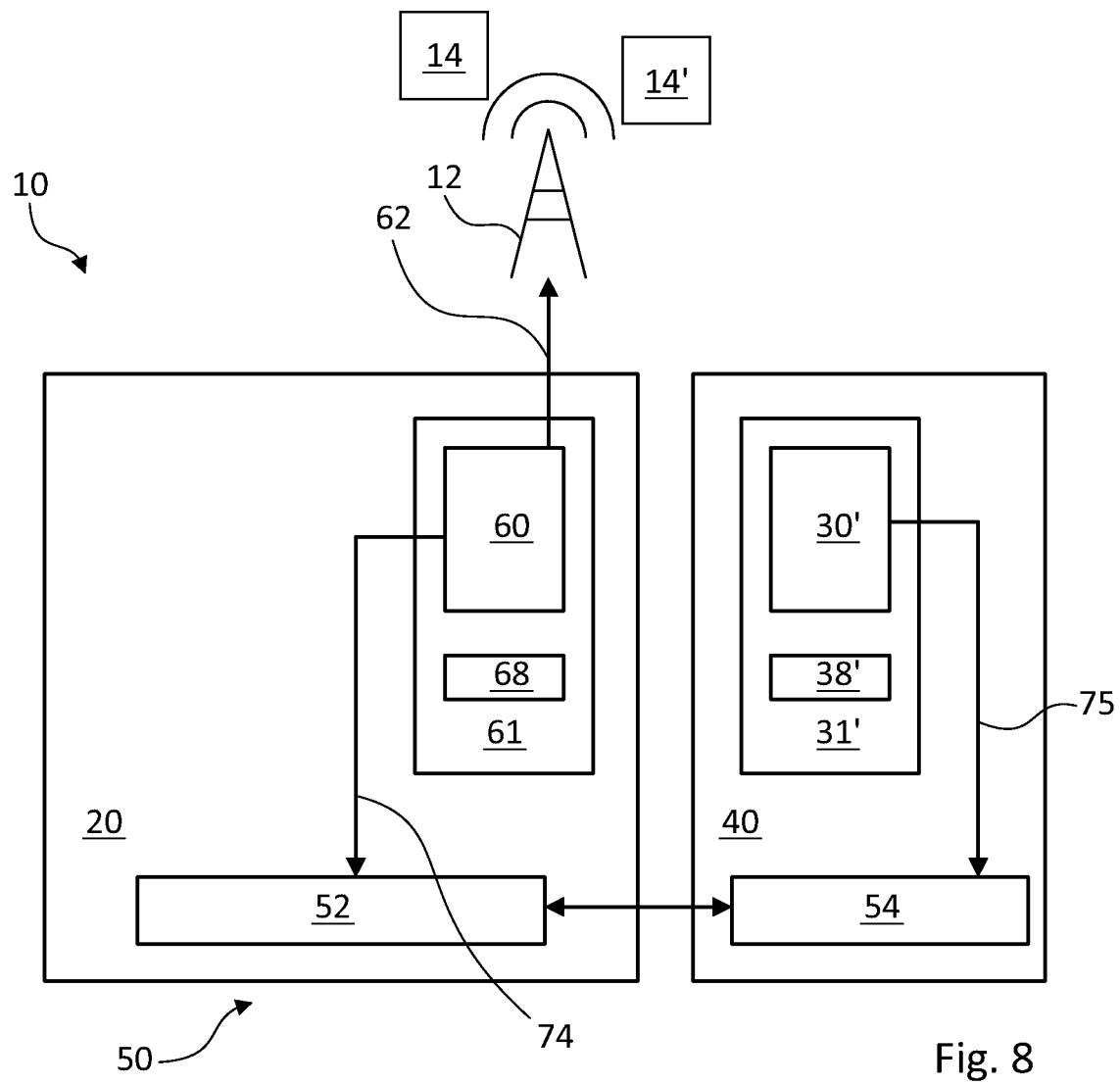
FIG. 8 shows the system of FIG. 7, the applications sending acknowledgement signals.

The migration manager component 50 is configured to transfer management of the at least one communication connection to the at least one terminal device 14 via the base station antenna structure 12 from the second application 60 to the first application 30'. The migration manager component 50 may be configured to provide a command 75 to the second application 60 to stop sending signals 62 to the at least one terminal device 14 and to provide a command 74 to the first application 30' to start sending signals 32' to the at least one terminal device 14 via the base station antenna structure 12. The migration manager component 50 may be configured to provide commands 74, 75 to the first and second application 20, 40, indicating a second point in time 82 at which the second application 60 is to stop (stops) sending signals 62 and the first application 30' is to start (starts) sending signals 32' via the base station antenna structure 12 (see FIG. 7). The second point in time 82 being later than the first point in time 80. The first application 30' and the second application 60 may be configured to send an acknowledgement signal 76, 77 to the migration manager component 50 in response to the command 74, 75 from the migration manager component 50 (see FIG. 8). The migration manager component 50 may be configured to send the signals 74, 75 to the first and second application 30', 60 again, if no acknowledgement signal 76, 77 is received. The migration manager component 50 may be configured to restart the first application 30', if (repeatedly) no acknowledgement signal is received.

Figure 9A:
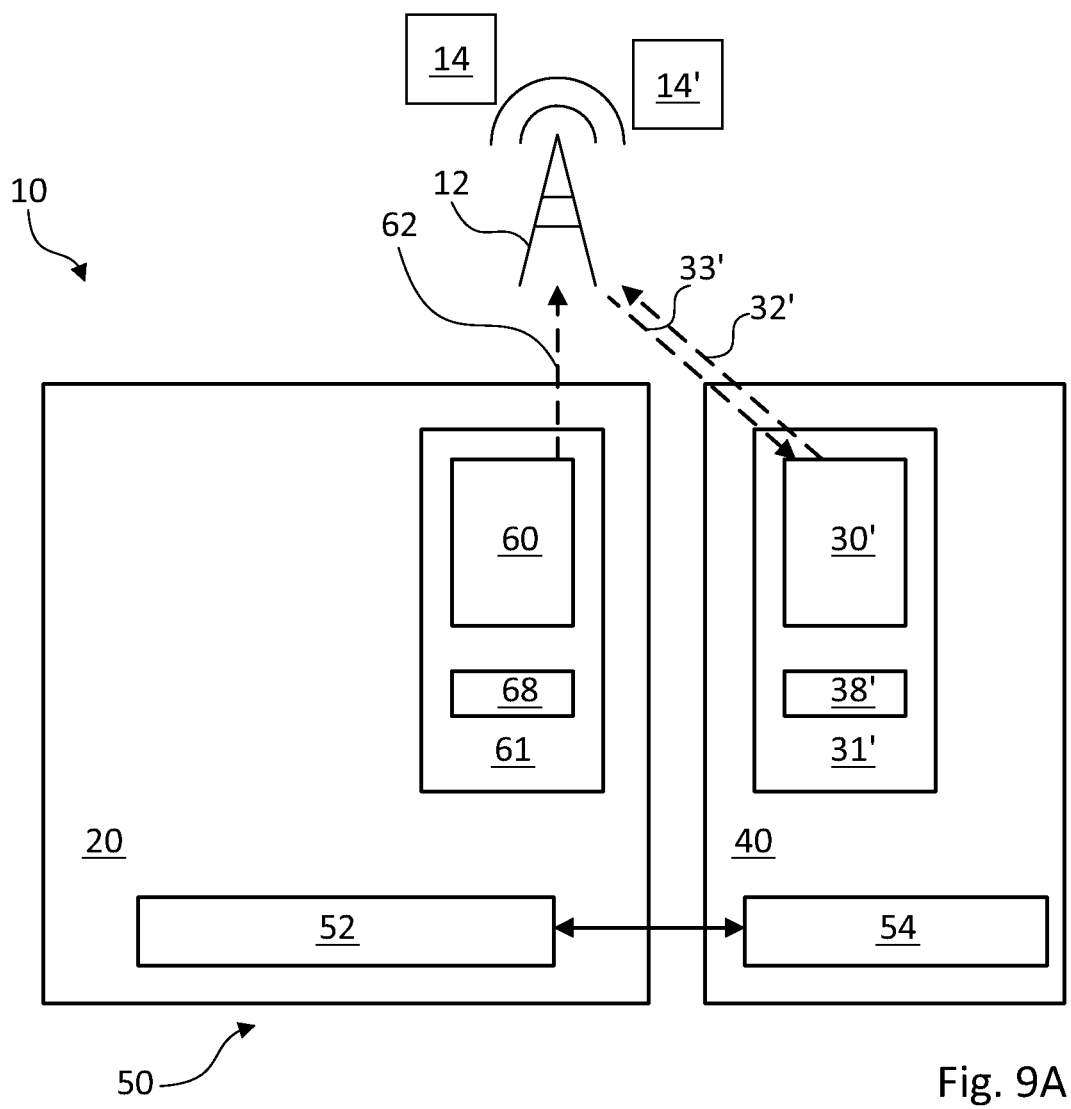
FIGS. 9A and 9B show the system of FIG. 8 at the second point in time and the stopping of the second application and the starting of the first application.
Figure 9B:
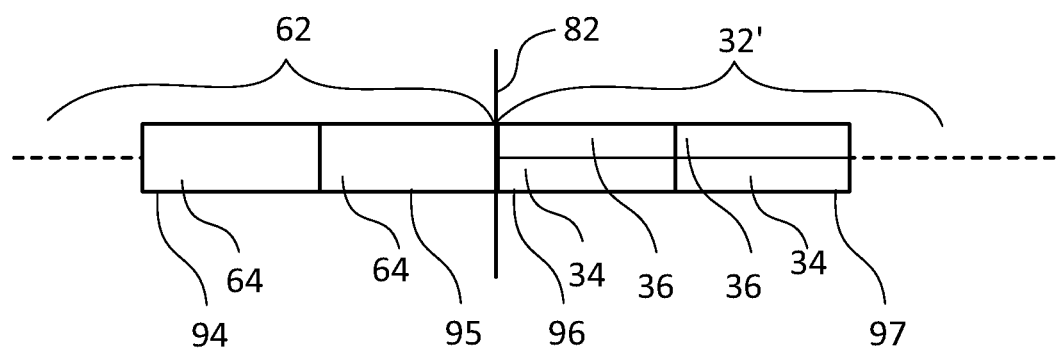

The first application 30' may be configured to receive time signals from a timer 38' (e.g. a real time clock, an internal timer). The timer 38' may be a timer of the virtual environment 31' in which the first application 30' is running. The timers 38', 68 of the first application 30' and the second application 60' are synchronized, e.g. via synchronized system timers of the first computing device 20 and the second computing device 40. The timers 38', 68 may be synchronized via the migration management circuit and/or via an external source (e.g. GPS). The first application 30' may be configured to start sending signals 32', when the timer 38' reaches the set second point in time 82 (see FIGS. 9A, 9B). The second application 60 may be configured to stop sending signals 62, when the timer 68 reaches the set second point in time 82. Connection management is transferred from the second application 60 to the first application 30' at the second point in time 82, wherein the second application 60 stops sending signals 62 and the first application 30' starts sending signals 32' via the base station antenna structure 12. FIG. 9B exemplarily shows an excerpt of the communication from the system 10 via the base station antenna structure 12. Before the second point in time 80, e.g. during two subframes 94, 95 immediately before the second point in time, the signal of the base station antenna structure 12 consists of the signals 62 of the second application 60, which contain only connection control signals 64. After the control has been taken over by the first application 30' at the second point in time 82, the signal sent via the base station antenna structure 12 contains the signals 32' of the first application 30', e.g. during the subframes 96, 97, which include connection control signals 34 as well as service data signals 36. The second point in time 80 is set to be at the end of subframe 95, which is the beginning of subframe 96. This allows a continuous connected status of the terminal devices 14.

The first application 30, 30' is configured to stop sending 32 signals via the base station antenna structure 12 at the first point in time 80 and to start sending signals 32 via the base station antenna structure 12 at the second point of time 82. The second application 60, 60' is configured to start sending signals 62 via the base station antenna structure 12 at the first point in time 80 and to stop sending signals 62 via the base station antenna structure 12 at the second point of time 82. The sending of service data signals 36, 36' is discontinued when the second application 60 is managing (during the time the second application 60 is managing) the at least one communication connection to the at least one terminal device 14 via the base station antenna structure 12. The sending of service data signals 36 via the base station antenna structure 12 is discontinued from the first point in time 80 until the second point in time 82. The sending of connection control signals 34, 64 is continued for the time between the first point in time 80 and the second point in time 82, e.g. during the whole transfer process. This may allow for a continuous connection of the terminal device (although no service data will be transmitted) and may prevent the need of the terminal device 14 to reconnect to the telecommunication base station (the system 10) after the first application was transferred (migrated) from the first to the second computing device 20, 40, which may lead to a higher availability of the communication network to the terminal device and/or to an increased efficiency of the telecommunication base station, since it may be abstained to handle connection procedures for all terminal devices that were connected with the telecommunication base station and would need to get reconnected after the transfer.

Figure 10:
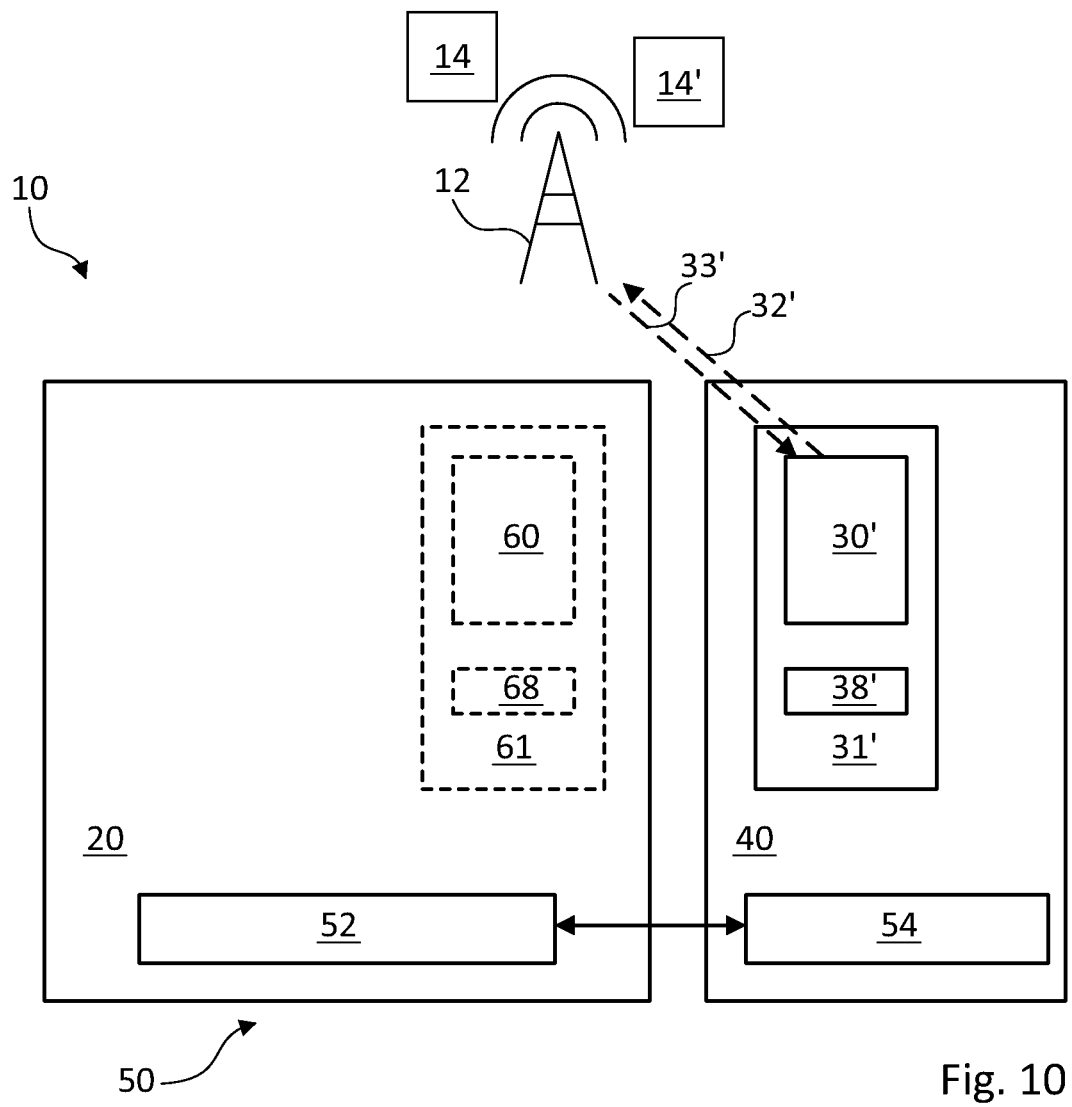
FIG. 10 shows the system of FIG. 10 after the second application was terminated.

After the first application 30' has taken over the communication, the migration manager component 50 may stop/terminate the second application 60 (see FIG. 10). Alternatively the migration manager component may be configured to keep the second application 60 running (in a hold state), e.g. if more applications are to be transferred to the second computing device or other computing devices.

Although the terminology used herein may indicate that the provided methods, systems and migration management circuits are to be used in connection with a communication technology according to Long Term Evolution (LTE), it is understood, that they may be adapted to be used in connection with existing or future communication technologies (e.g. communication technologies according to the definitions of the third generation partnership program/3GPP).

If in the previous description it is mentioned that a component is configured to perform a specific action it is understood that the component may be executing that specific action in at least one corresponding method.

The following examples pertain to further non-limiting embodiments.

Example 1 is a method for transferring a first application running on a first computing device from the first computing device to a second computing device, the first application being configured to manage at least one communication connection to at least one terminal device via a base station antenna structure, the method comprising: initializing a second application configured to manage the at least one communication connection to the at least one terminal device via the base station antenna structure; transferring management of the at least one communication connection from the first application to the second application; stopping the execution of the first application at the first computing device; initializing the first application at the second computing device; transferring management of the at least one communication connection from the second application to the first application.

In Example 2, the subject matter of Example 1 may optionally include that transferring management of the at least one communication connection from the first application to the second application includes stopping sending signals to the at least one terminal device via the first application and starting sending signals to the at least one terminal device via the second application.

In Example 3, the subject matter of any of Examples 1-2 may optionally include that transferring management of the at least one communication connection from the second application to the first application includes stopping sending signals to the at least one terminal device via the second application and starting sending signals to the at least one terminal device via the first application.

In Example 4, the subject matter of any of Examples 1-3 may optionally include that the first application is run in a virtual environment on at least one of the first and second computing device.

In Example 5, the subject matter of any of Examples 1-4 may optionally include that the initializing of the first application on the second computing device includes duplicating the state of the memory of the first application from the first computing device to the second computing device.

In Example 6, the subject matter of any of Examples 1-5 may optionally include that the second application is initialized on the first computing device.

In Example 7, the subject matter of any of Examples 1-6 may optionally include that the second application is run in a virtual environment.

In Example 8, the subject matter of any of Examples 1-7 may optionally include that the base station antenna structure together with the first application forms an evolved NodeB.

In Example 9, the subject matter of any of Examples 1-8 may optionally include that the sending of service data signals is discontinued when the second application is managing the at least one communication connection to the at least one terminal device via the base station antenna structure.

In Example 10, the subject matter of any of Examples 1-9 may optionally include that the second application takes over a task of continuously sending control signals via the base station antenna structure from the first application, when the second application is managing the at least one communication connection.

Example 11 is A system for managing terminal device communication connections, comprising: a first computing device configured to execute a first application configured to manage at least one communication connection to at least one terminal device via a base station antenna structure; a second computing device configured to execute the first application; a migration manager component, configured to control a transfer of the first application from the first computing device to the second computing device; the migration manager component being configured to initialize a second application configured to manage the at least one communication connection to the at least one terminal device via the base station antenna structure; the migration manager component further being configured to provide a command to the first application to transfer management of the at least one communication connection from the first application to the second application; the migration manager component further being configured to stop an execution the first application at the first computing device and to initialize the first application at the second computing device; the migration manager component further being configured to provide a command to the second application to transfer management of the at least one communication connection from the second application to the first application.

In Example 12, the subject matter of Example 11 may optionally include that transferring management of the at least one communication connection from the first application to the second application includes stopping sending signals to the at least one terminal device via the first application and starting sending signals to the at least one terminal device via the second application.

In Example 13, the subject matter of any of Examples 11-12 may optionally include that transferring management of the at least one communication connection from the second application to the first application includes stopping sending signals to the at least one terminal device via the second application and starting sending signals to the at least one terminal device via the first application.

In Example 14, the subject matter of any of Examples 11-13 may optionally include that at least one of the first and second computing devices is configured to run the first application in a virtual environment.

In Example 15, the subject matter of any of Examples 11-14 may optionally include that the migration manager component is configured to duplicate the state of the memory of the first application from the first computing device to the second computing device.

In Example 16, the subject matter of any of Examples 11-15 may optionally include that the migration manager component is configured to initialize the second application on the first computing device.

In Example 17, the subject matter of any of Examples 11-16 may optionally include that the migration manager component is configured to initialize the second application in a virtual environment.

In Example 18, the subject matter of any of Examples 11-17 may optionally include that the migration manager component is implemented as applications running on the first and second computing devices.

In Example 19, the subject matter of any of Examples 11-18 may optionally include that the first and second application are configured to send an acknowledgement signal to the migration manager component in response to the signal from the migration manager component.

In Example 20, the subject matter of any of Examples 11-19 may optionally include that the base station antenna structure together with the first application forms an evolved Node B.

In Example 21, the subject matter of any of Examples 11-20 may optionally include that the first application is configured to stop sending signals via the telecommunication base station at a first point in time and to start sending signals via the telecommunication base station at a second point of time.

In Example 22, the subject matter of any of Examples 11-21 may optionally include that the second application is configured to start sending signals via the telecommunication base station at the first point in time and to stop sending signals via the telecommunication base station at the second point of time.

Example 23 is a migration manager component for transferring a first application running on a first computing device from the first computing device to a second computing device, the first application being configured to manage at least one communication connection to at least one terminal device via a base station antenna structure, the migration manager component being configured to: initialize a second application configured to manage the at least one communication connection to at least one terminal device via a base station antenna structure; provide a command to the first application to transfer management of the at least one communication connection from the first application to the second application; stop an execution the first application at the first computing device and to initialize the first application at the second computing device; provide a command to the second application to transfer management of the at least one communication connection from the second application to the first application.

In Example 24, the subject matter of Example 23 may optionally include that transferring management of the at least one communication connection from the first application to the second application includes stopping sending signals to the at least one terminal device via the first application and starting sending signals to the at least one terminal device via the second application.

In Example 25, the subject matter of any of Examples 23-24 may optionally include that transferring management of the at least one communication connection from the second application to the first application includes stopping sending signals to the at least one terminal device via the second application and starting sending signals to the at least one terminal device via the first application.

In Example 26, the subject matter of any of Examples 23-25 may optionally include that the Migration manager component is further configured to duplicate the state of the memory of the first application from the first computing device to the second computing device.

In Example 27, the subject matter of any of Examples 23-26 may optionally include that the Migration manager component is further configured to initialize the second application on the first computing device.

In Example 28, the subject matter of any of Examples 23-27 may optionally include that the Migration manager component is further configured to initialize the second application in a virtual environment.

In Example 29, the subject matter of any of Examples 23-28 may optionally include that the Migration manager component is including at least a first component running as an application on the first computing device and including at least a second component running as an application on the second computing device.

In Example 30, the subject matter of any of Examples 23-29 may optionally include that the base station antenna structure together with the first application forms an evolved NodeB.

Example 31 is a method for transferring a first application running on a first computing device from the first computing device to a second computing device, the first application being configured to manage at least one communication connection of at least one terminal device to a telecommunication network via a base station antenna structure by sending first signals including connection control signals and service data signals to the at least one terminal device, the method including: initializing a second application configured to manage the at least one communication connection of the at least one terminal device to the telecommunication network via the base station antenna structure by sending second signals including connection control signals to the at least one terminal device; transferring management of the at least one communication connection of the at least one terminal device to the telecommunication network via the base station antenna structure from the first application to the second application, wherein the first application stops sending first signals and the second application starts sending second signals; stopping the execution of the first application at the first computing device; initializing the first application at the second computing device; transferring management of the at least one connection of the at least one terminal device to the telecommunication network via the base station antenna structure from the second application to the first application, wherein the second application stops sending second signals and the first application starts sending first signals.

In Example 32, the subject matter of Example 31 may optionally include that the first application is run in a virtual environment on at least one of the first and second computing device.

In Example 33, the subject matter of any of Examples 31-32 may optionally include that initializing the first application on the second computing device includes duplicating the state of the memory of the first application from the first computing device to the second computing device.

In Example 34, the subject matter of any of Examples 31-33 may optionally include that the second application is initialized on the first computing device.

In Example 35, the subject matter of any of Examples 31-34 may optionally include that the second application is run in a virtual environment.

In Example 36, the subject matter of any of Examples 31-35 may optionally include that the base station antenna structure together with the first application forms an evolved NodeB.

In Example 37, the subject matter of any of Examples 31-36 may optionally include that the sending of service data signals is discontinued when the second application is managing the at least one communication connection to the at least one terminal device via the base station antenna structure.

In Example 38, the subject matter of any of Examples 31-37 may optionally include that the second application takes over a task of continuously sending control signals via the base station antenna structure from the first application, when the second application is managing the at least one communication connection.

Example 39 is a non-transitory computer readable medium (machine readable storage) with program instructions configured to perform the method of any of Examples 1 to 11 and 31 to 38.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method, comprising:
executing a migration manager for transferring a first application running on a first computing device from the first computing device to a second computing device, the first application being configured to manage at least one communication connection to at least one terminal device via a base station antenna structure, wherein the first application uses first base station antenna structure parameters, and wherein said executing the migration manager comprises:
initializing a second application configured to manage the at least one communication connection to the at least one terminal device via the base station antenna structure, wherein the second application is initialized using the first base station antenna structure parameters, wherein sending of service data signals between the at least one terminal device and the base station antenna structure is discontinued when the second application is managing the at least one communication connection to the at least one terminal device via the base station antenna structure, and wherein the second application takes over a task of continuously sending control signals via the base station antenna structure from the first application when the second application is managing the at least one communication connection;
transferring management of the at least one communication connection from the first application to the second application;
stopping the execution of the first application at the first computing device;
initializing the first application at the second computing device; and
transferring management of the at least one communication connection from the second application to the first application.

2. The method according to claim 1, wherein transferring management of the at least one communication connection from the first application to the second application includes stopping sending signals to the at least one terminal device via the first application and starting sending signals to the at least one terminal device via the second application.

3. The method according to claim 1, wherein transferring management of the at least one communication connection from the second application to the first application includes stopping sending signals to the at least one terminal device via the second application and starting sending signals to the at least one terminal device via the first application.

4. The method according to claim 1, wherein the first application is executed in a virtual environment on at least one of the first and second computing device.

5. The method according to claim 1, wherein initializing the first application on the second computing device includes duplicating a state of a memory of the first application in the second computing device.

6. The method according to claim 1, wherein the second application is executed in a virtual environment.

7. The method according to claim 1, wherein the base station antenna structure and the first application form an evolved NodeB.

8. A system for managing terminal device communication connections, comprising:
a first computing device configured to execute a first application configured to manage at least one communication connection to at least one terminal device via a base station antenna structure using first base station antenna structure parameters;
a second computing device configured to execute the first application; and
a migration manager component, configured to:
control a transfer of the first application from the first computing device to the second computing device,
initialize a second application configured to manage the at least one communication connection to the at least one terminal device via the base station antenna structure, wherein the second application is initialized using the first base station antenna structure parameters, wherein sending of service data signals between the at least one terminal device and the base station antenna structure is discontinued when the second application is managing the at least one communication connection to the at least one terminal device via the base station antenna structure, and wherein the second application takes over a task of continuously sending control signals via the base station antenna structure from the first application when the second application is managing the at least one communication connection;
provide a command to the first application to transfer management of the at least one communication connection from the first application to the second application;
stop an execution the first application at the first computing device and to initialize the first application at the second computing device; and
provide a command to the second application to transfer management of the at least one communication connection from the second application to the first application.

9. The system according to claim 8, wherein transferring management of the at least one communication connection from the first application to the second application includes stopping sending signals to the at least one terminal device via the first application and starting sending signals to the at least one terminal device via the second application.

10. The system according to claim 8, wherein transferring management of the at least one communication connection from the second application to the first application includes stopping sending signals to the at least one terminal device via the second application and starting sending signals to the at least one terminal device via the first application.

11. The system according to claim 8, wherein at least one of the first and second computing devices is configured to run the first application in a virtual environment.

12. The system according to claim 8, wherein the migration manager component is configured to duplicate a state of a memory of the first application in the second computing device.

13. The system according to claim 8, wherein the migration manager component is configured to initialize the second application in a virtual environment.

14. The system according to claim 8, wherein the migration manager component is implemented as applications running on the first and second computing devices.

15. The system according to claim 8, wherein the first and second applications are configured to send an acknowledgement signal to the migration manager component in response to the command from the migration manager component.

16. The system according to claim 8, wherein the base station antenna structure and the first application form an evolved Node B.

17. The system according to claim 8, wherein the first application is configured to stop sending signals to the at least one terminal device at a first point in time and to start sending signals to the at least one terminal device at a second point of time.

18. The system according to claim 17, wherein the second application is configured to start sending signals to the at least one terminal device at the first point in time and to stop sending signals to the at least one terminal device at the second point of time.

19. A migration manager component circuit for transferring a first application running on a first computing device from the first computing device to a second computing device, the first application being configured to manage at least one communication connection to at least one terminal device via a base station antenna structure, wherein the first application uses first base station antenna structure parameters, wherein the migration manager component circuit comprises a processor and memory, wherein the memory stores program instructions executable by the processor, and wherein when executed, the program instructions cause the processor to:
   initialize a second application configured to manage the at least one communication connection to at least one terminal device via a base station antenna structure, wherein the second application is initialized using the first base station antenna structure parameters, wherein sending of service data signals between the at least one terminal device and the base station antenna structure is discontinued when the second application is managing the at least one communication connection to the at least one terminal device via the base station antenna structure, and wherein the second application takes over a task of continuously sending control signals via the base station antenna structure from the first application when the second application is managing the at least one communication connection;
   provide a command to the first application to transfer management of the at least one communication connection from the first application to the second application;
   stop an execution the first application at the first computing device and to initialize the first application at the second computing device; and
   provide a command to the second application to transfer management of the at least one communication connection from the second application to the first application.

20. A method, comprising:
   executing a migration manager for transferring a first application running on a first computing device from the first computing device to a second computing device, the first application being configured to manage at least one communication connection of at least one terminal device to a telecommunication network via a base station antenna structure by sending first signals comprising connection control signals and service data signals to the at least one terminal device, wherein the first application uses first base station antenna structure parameters, and wherein said executing the migration manager comprises:
      initializing a second application configured to manage the at least one communication connection of the at least one terminal device to the telecommunication network via the base station antenna structure by sending second signals comprising connection control signals to the at least one terminal device wherein the second application is initialized using the first base station antenna structure parameters, wherein sending of service data signals between the at least one terminal device and the base station antenna structure is discontinued when the second application is managing the at least one communication connection to the at least one terminal device via the base station antenna structure, and wherein the second application takes over a task of continuously sending control signals via the base station antenna structure from the first application when the second application is managing the at least one communication connection;
      transferring management of the at least one communication connection of the at least one terminal device to the telecommunication network via the base station antenna structure from the first application to the second application, wherein the first application stops sending the first signals and the second application starts sending the second signals;
      stopping the execution of the first application at the first computing device;
      initializing the first application at the second computing device; and
      transferring management of the at least one connection of the at least one terminal device to the telecommunication network via the base station antenna structure from the second application to the first application, wherein the second application stops sending the second signals and the first application starts sending the first signals.

21. A non-transitory computer readable medium with program instructions executable to implement a migration manager, wherein the migration manager is configured to perform a method for transferring a first application running on a first computing device from the first computing device to a second computing device, the first application being configured to manage at least one communication connection to at least one terminal device via a base station antenna structure, wherein the first application uses first base station antenna structure parameters, and wherein the method comprises:
   initializing a second application configured to manage the at least one communication connection to the at least one terminal device via the base station antenna structure, wherein the second application is initialized using the first base station antenna structure parameters, wherein sending of service data signals between the at least one terminal device and the base station antenna structure is discontinued when the second application is managing the at least one communication connection to the at least one terminal device via the base station antenna structure, and wherein the second application takes over a task of continuously sending control signals via the base station antenna structure from the first application when the second application is managing the at least one communication connection;
   transferring management of the at least one communication connection from the first application to the second application;
   stopping the execution of the first application at the first computing device;

initializing the first application at the second computing device; and transferring management of the at least one communication connection from the second application to the first application.

22. The non-transitory computer readable medium of claim 21, wherein transferring management of the at least one communication connection from the first application to the second application includes stopping sending signals to the at least one terminal device via the first application and starting sending signals to the at least one terminal device via the second application.

23. The non-transitory computer readable medium of claim 21, wherein transferring management of the at least one communication connection from the second application to the first application includes stopping sending signals to the at least one terminal device via the second application and starting sending signals to the at least one terminal device via the first application.

24. The non-transitory computer readable medium of claim 21, wherein the first application is executed in a virtual environment on at least one of the first and second computing device.

25. The non-transitory computer readable medium of claim 21, wherein initializing the first application on the second computing device includes duplicating a state of a memory of the first application in the second computing device.

* * * * *